US012342764B1

(12) United States Patent
Meiser

(10) Patent No.: US 12,342,764 B1
(45) Date of Patent: Jul. 1, 2025

(54) MULCH-DISPENSING SYSTEM

(71) Applicant: Hogan E. Meiser, Wilmington, NC (US)

(72) Inventor: Hogan E. Meiser, Wilmington, NC (US)

( * ) Notice: Subject to any disclaimer, the term of this patent is extended or adjusted under 35 U.S.C. 154(b) by 0 days.

(21) Appl. No.: 18/488,178

(22) Filed: Oct. 17, 2023

(51) Int. Cl.
*A01G 13/37* (2025.01)
*A01G 13/35* (2025.01)

(52) U.S. Cl.
CPC ............ *A01G 13/37* (2025.01); *A01G 13/35* (2025.01)

(58) Field of Classification Search
CPC ............ A01G 13/0262; A01G 13/0287; A01D 41/1243; B60P 1/38; B60P 1/60; B02C 13/288; B05B 7/1409
See application file for complete search history.

(56) References Cited

U.S. PATENT DOCUMENTS

| | | | | |
|---|---|---|---|---|
| 3,676,170 | A * | 7/1972 | Kempthorne | B05B 7/1431 239/428 |
| 5,876,047 | A | 3/1999 | Dennis | |
| 6,247,876 | B1 * | 6/2001 | Stephens | B65G 53/28 406/39 |
| 6,840,468 | B2 * | 1/2005 | Barnett | E01C 19/205 239/289 |
| 7,846,493 | B1 * | 12/2010 | Cox | B05D 1/12 427/206 |
| 8,091,815 | B2 * | 1/2012 | Tardif | B62B 1/204 241/101.78 |
| 8,746,377 | B1 | 6/2014 | Dunbar | |
| 9,108,690 | B2 | 8/2015 | Rowlands | |
| 9,334,661 | B2 * | 5/2016 | Lavallee, II | E04F 21/085 |
| D779,762 | S | 2/2017 | Wyse | |
| 9,731,779 | B2 | 8/2017 | Lamb | |
| 9,821,830 | B1 | 11/2017 | Matlock | |
| D814,137 | S * | 3/2018 | Linto | D34/27 |
| 10,326,300 | B2 | 6/2019 | Jones | |
| 10,582,819 | B2 * | 3/2020 | Sickler | A47L 7/0019 |
| 10,721,876 | B1 | 7/2020 | Schmutz | |
| 10,721,877 | B2 * | 7/2020 | O'Neil | A01G 3/002 |
| 11,584,285 | B2 | 2/2023 | Skilkavich | |
| 2015/0291078 | A1 * | 10/2015 | Carrillo, Jr. | B60P 3/426 296/100.02 |
| 2017/0190275 | A1 | 7/2017 | Helmsderfer | |
| 2018/0009455 | A1 | 1/2018 | Noonan | |
| 2019/0045986 | A1 * | 2/2019 | Anderson | B62B 1/204 |
| 2019/0289796 | A1 * | 9/2019 | White | F04D 25/0673 |
| 2020/0000049 | A1 | 1/2020 | D'Neil | |
| 2022/0017134 | A1 * | 1/2022 | Gaerke | B62D 51/005 |
| 2022/0315080 | A1 | 10/2022 | Sombell | |

FOREIGN PATENT DOCUMENTS

WO    20150212267    2/2015

* cited by examiner

*Primary Examiner* — Ebony E Evans
(74) *Attorney, Agent, or Firm* — Kyle A. Fletcher, Esq.

(57) ABSTRACT

The mulch-dispensing system includes a blower, a cover, and one or more batteries. The cover may detachably couple to the top of a container holding mulch. The blower may be energized by the one or more batteries. The blower may draw the mulch into an inlet and may expel the mulch from a discharge hose. The discharge hose may be adapted to be held by a user to direct the mulch onto targeted landscape areas. As a non-limiting example, the container may be a wheelbarrow. In some embodiments, the mulch-dispensing system may include a cart as the container. In some embodiments, the cart may be self-propelled.

17 Claims, 6 Drawing Sheets

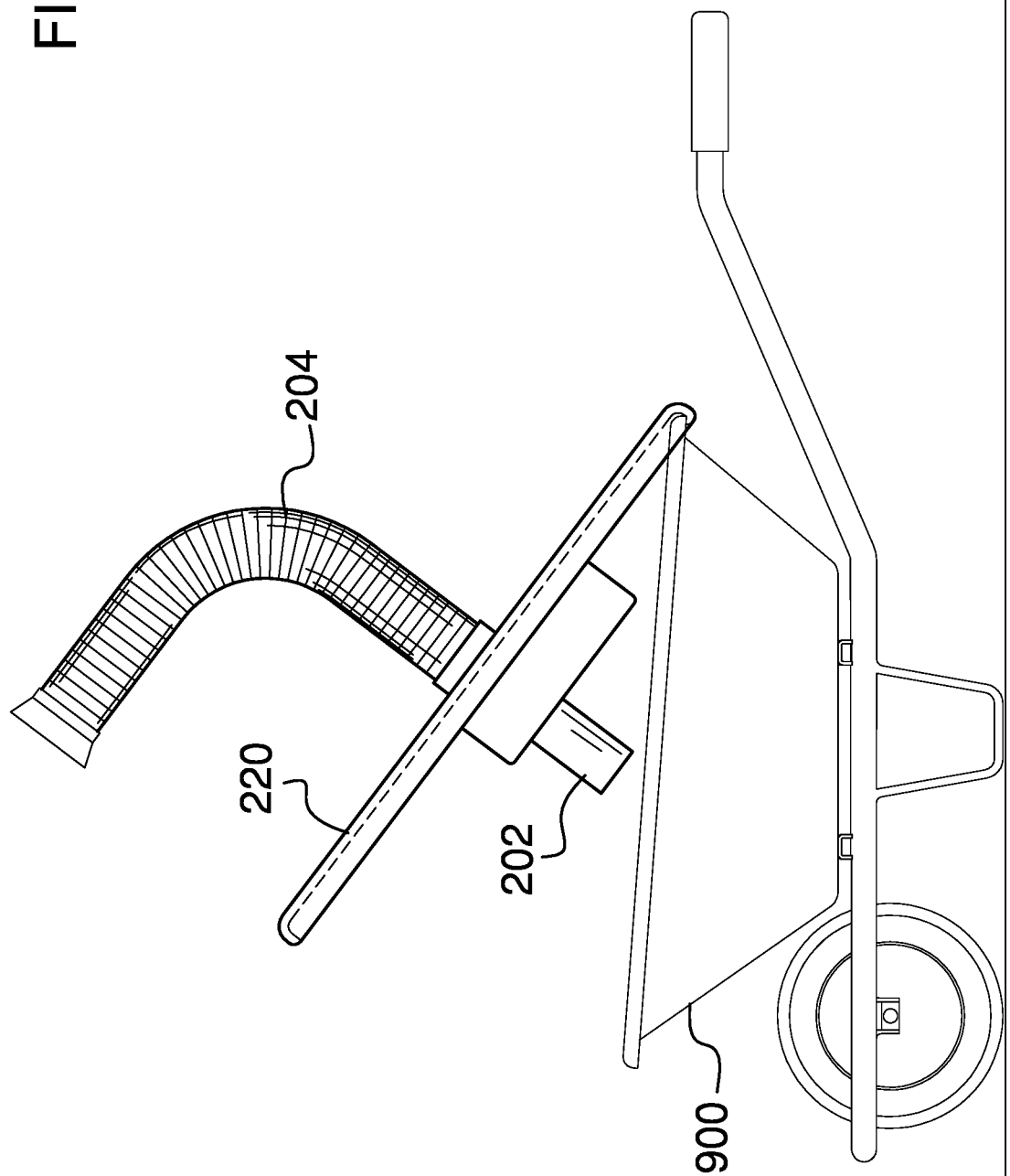

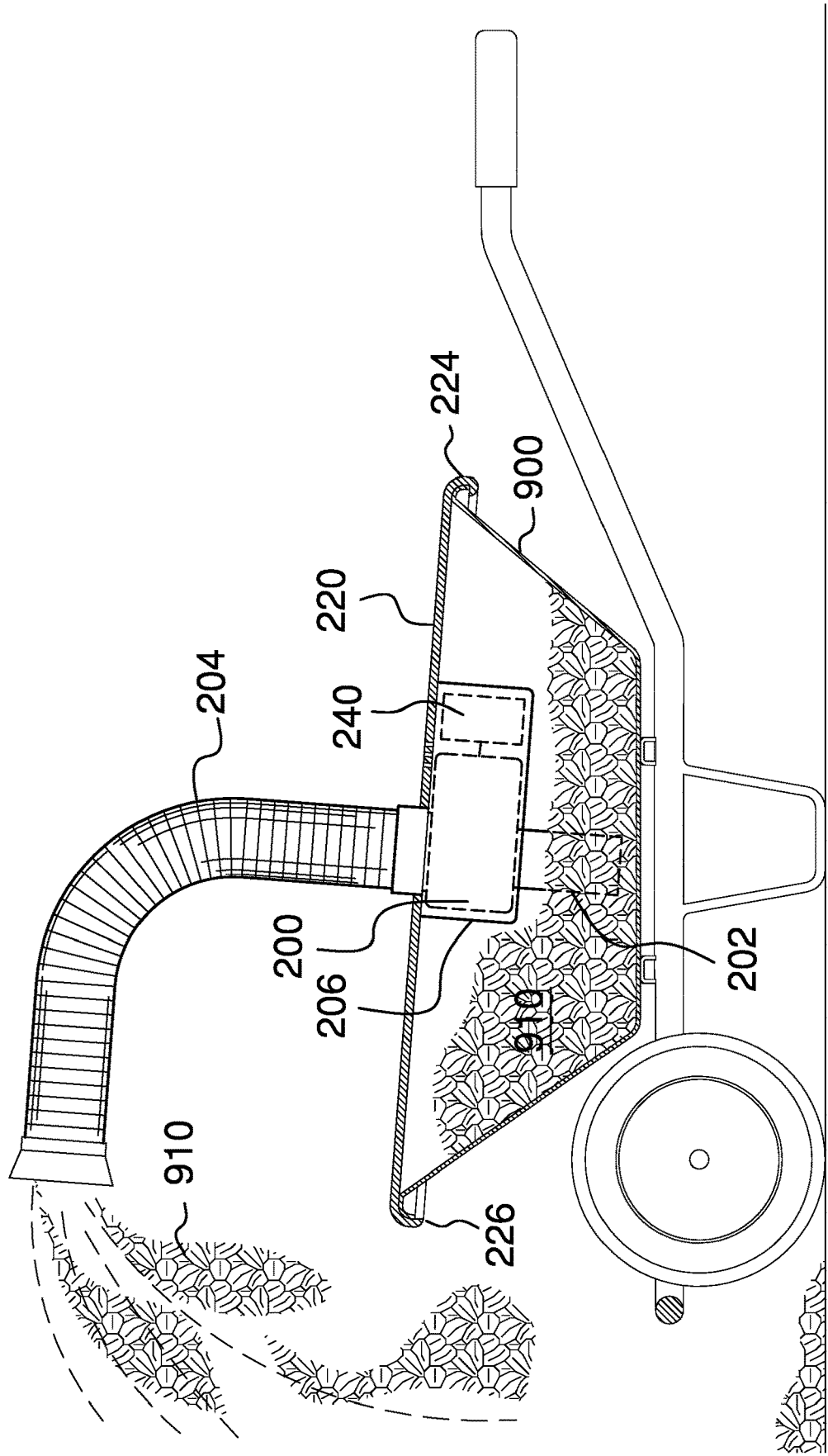

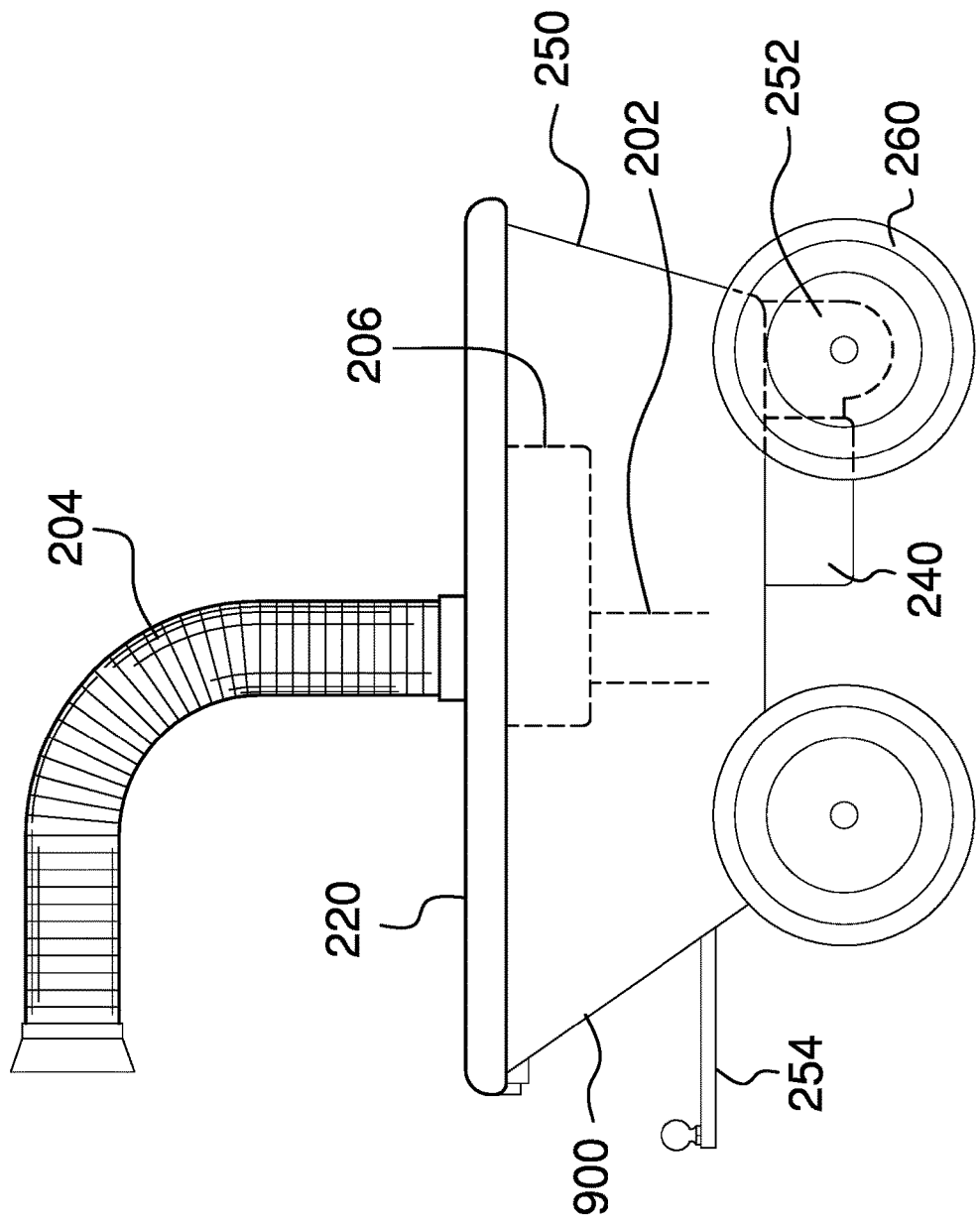

MULCH-DISPENSING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of gardening equipment and mulch spreaders, more specifically, a mulch-dispensing system.

SUMMARY OF INVENTION

The mulch-dispensing system comprises a blower, a cover, and one or more batteries. The cover may detachably couple to the top of a container holding mulch. The blower may be energized by the one or more batteries. The blower may draw the mulch into an inlet and may expel the mulch from a discharge hose. The discharge hose may be adapted to be held by a user to direct the mulch onto targeted landscape areas. As a non-limiting example, the container may be a wheelbarrow. In some embodiments, the mulch-dispensing system may comprise a cart as the container. The cart may be pulled via a hitch. In some embodiments, the cart may be self-propelled.

An object of the invention is to provide a cover for a container holding mulch.

Another object of the invention is to provide a blower that may draw mulch from the container and dispense the mulch via a discharge hose.

A further object of the invention is to provide one or more batteries to energize the blower.

Yet another object of the invention is to provide a cart as the container and a drive motor to make the cart self-propelled.

These together with additional objects, features and advantages of the mulch-dispensing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the mulch-dispensing system in detail, it is to be understood that the mulch-dispensing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mulch-dispensing system.

It is therefore important that the claims be regarded as including such equivalent construction insofar as they do not depart from the spirit and scope of the mulch-dispensing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a side view of an embodiment of the disclosure.

FIG. 6 is a side detail view of an embodiment of the disclosure.

FIG. 7 is a side detail view of a second embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
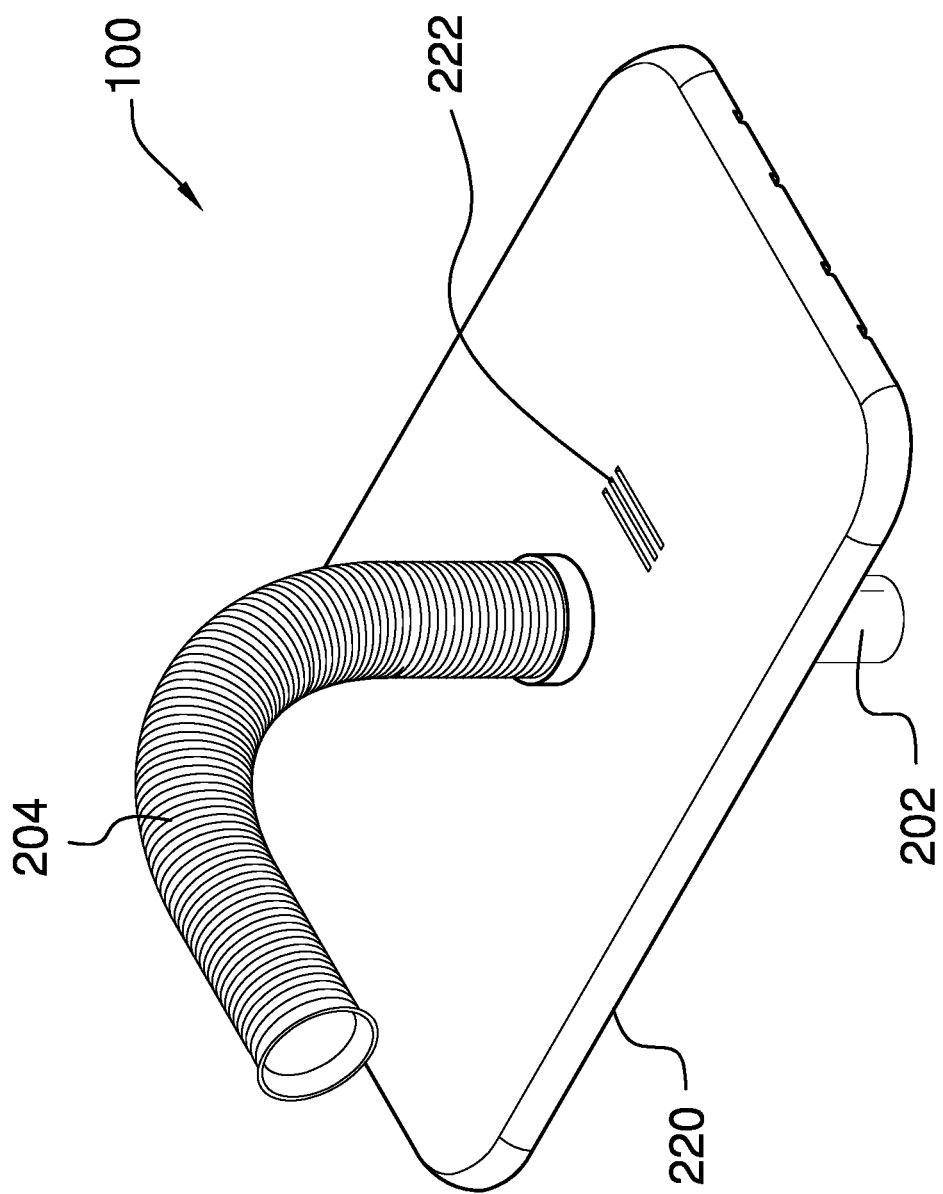
FIG. 1 is an isometric view of an embodiment of the disclosure.
Figure 2:
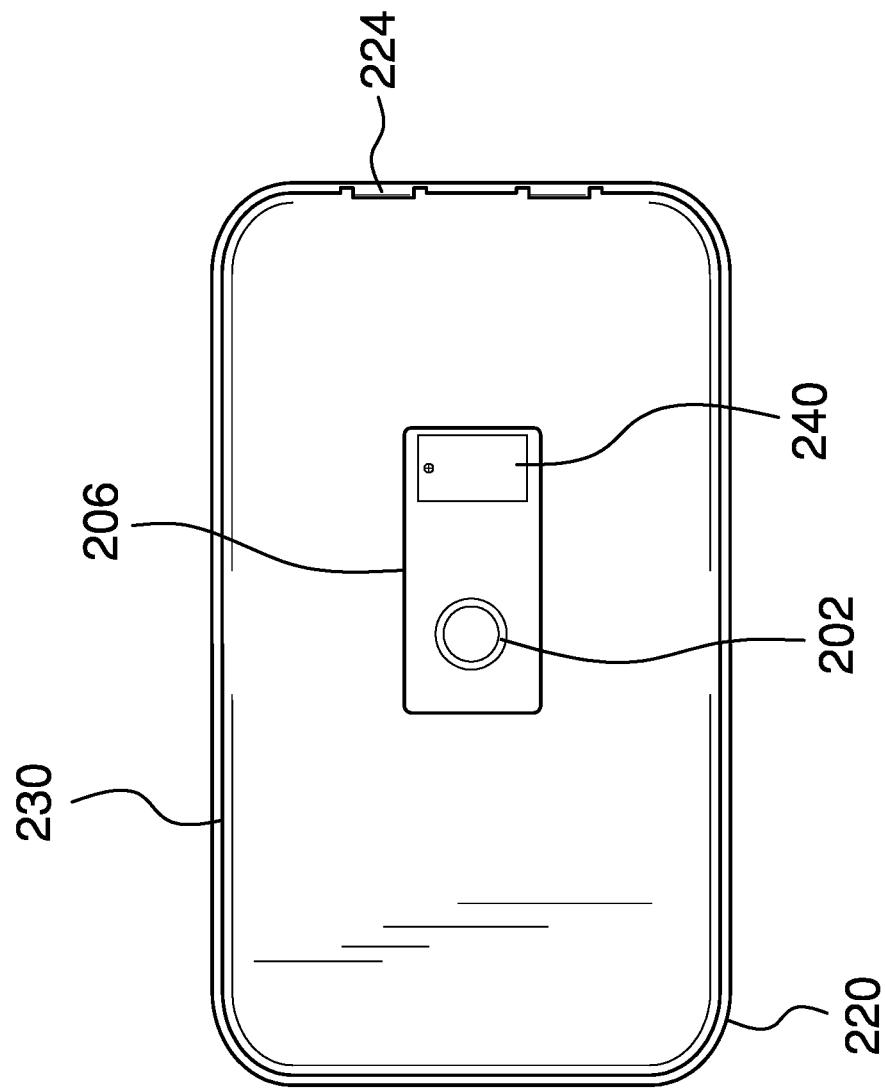
FIG. 2 is a bottom view of an embodiment of the disclosure.
Figure 3:
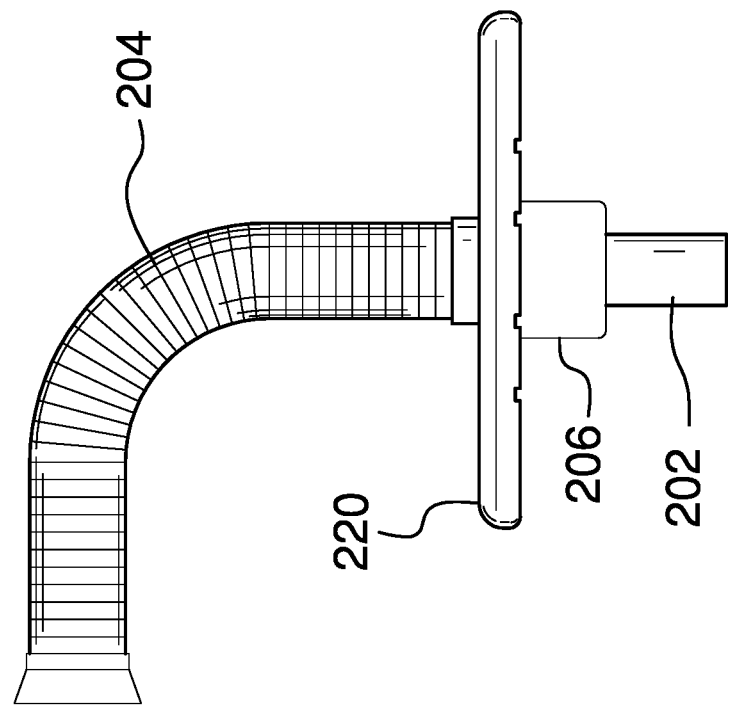
FIG. 3 is a front view of an embodiment of the disclosure.
Figure 4:
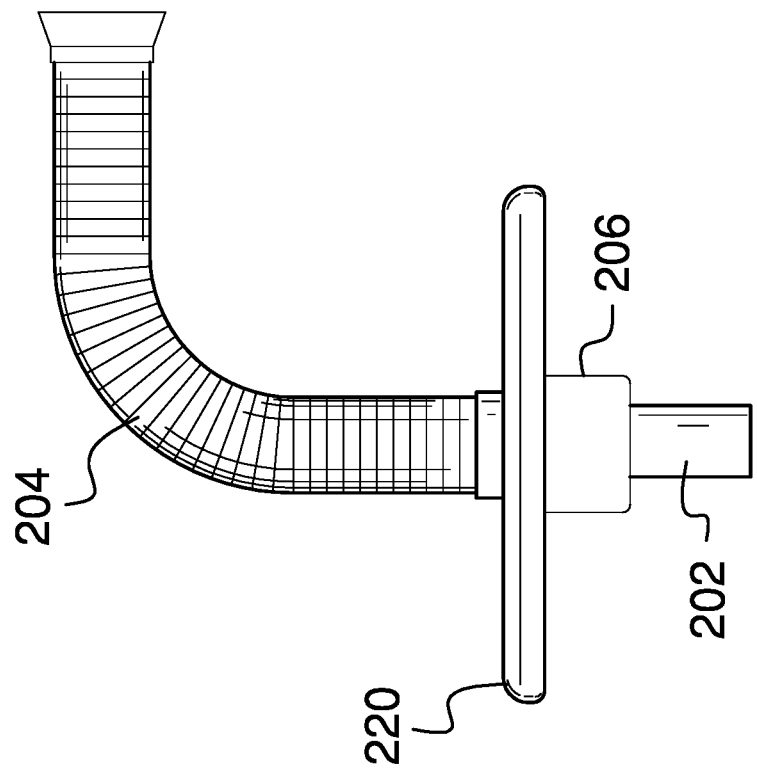
FIG. 4 is a rear view of an embodiment of the disclosure.

Detailed reference will now be made to a first potential embodiment of the disclosure, which is illustrated in FIGS. 1 through 7.

The mulch-dispensing system 100 (hereinafter invention) comprises a blower 200, a cover 220, and one or more batteries 240. The cover 220 may detachably couple to the top of a container 900 holding mulch 910. The blower 200 may be energized by the one or more batteries 240. The blower 200 may draw the mulch 910 into an inlet 202 and may expel the mulch 910 from a discharge hose 204. The discharge hose 204 may be adapted to be held by a user to direct the mulch 910 onto targeted landscape areas. As a non-limiting example, the container 900 may be a wheelbarrow. In some embodiments, the invention 100 may comprise a cart 250 as the container 900. In some embodiments, the cart 250 may be self-propelled.

The blower 200 may move the mulch 910 by drawing the mulch 910 in through the inlet 202 and expelling the mulch 910 through the discharge hose 204. The blower 200 may be electromechanical in nature. As a non-limiting example, an internal electric motor of the blower 200 may be energized and may rotate an impeller, may spin fan blades, or may move other mechanical parts to draw the mulch 910 in via the inlet 202 and expel the mulch 910 via the discharge hose 204.

The inlet 202 may be a rigid tube located within the container 900 and oriented to extend downward from the bottom of the blower 200 into the mulch 910.

The discharge hose 204 may be a flexible hose located outside of the container 900 through which the mulch 910 may pass after exiting the blower 200.

The blower 200 may be enclosed by a blower housing 206 located within the container 900.

The cover 220 may be a lid that may detachably couple to the container 900. The cover 220 may enable the blower 200 to lower the air pressure within the container 900, creating a partial vacuum within the container 900, in order to draw the mulch 910 into the blower 200. The cover 220 may comprise a pivot clamp 224 that may couple to the top of the container 900 at one end of the container 900. The cover 220 may pivot open at the pivot clamp 224 in order to place the mulch 910 into the container 900. The cover 220 may comprise a latch 226 at the end of the cover 220 that is opposite the pivot clamp 224. The latch 226 may removably couple to the top of the container 900. The latch 226 may be operable to hold the cover 220 closed while using the invention 100.

The cover 220 may comprise a rim 230. The rim 230 may project downward from the periphery of the cover 220 and May surround the top of the container 900 when the cover 220 is closed. An inside edge of the rim 230 may engage the container 900 by pressing against the container 900 in order to create a seal between the cover 220 and the container 900.

The cover 220 may comprise a vent aperture 222. The vent aperture 222 may be operable to provide a path for air to enter the container 900 to replace the air pumped out by the blower 200.

The one or more batteries 240 may comprise one or more energy-storage devices. The one or more batteries 240 may be a source of electrical energy to operate the blower 200. The one or more batteries 240 may be rechargeable and/or replaceable.

In some embodiments, the invention 100 may comprise the cart 250 as the container 900. The cart 250 may be a four-wheeled wagon for holding the mulch 910. The cart 250 may be configured to be pulled via a hitch 254.

In some embodiments, the cart 250 may be self-propelled. As a non-limiting example, the cart 250 may comprise a drive motor 252 that may be directly or indirectly coupled to a rear wheels 260 of the cart 250 such that energizing the drive motor 252 may cause the rear wheels 260 to turn.

In some embodiments, the one or more batteries 240 may be coupled to the underside of the cart 250.

In use, mulch 910 may be placed into the container 900 and the cover 220 may be coupled to the top of the container 900. The blower 200 may be energized by the one or more batteries 240. The blower 200 may draw the mulch 910 into the inlet 202 and may expel the mulch 910 through the discharge hose 204. The user may hold the discharge hose 204 and may aim the discharge hose 204 to direct the mulch 910 towards targeted landscape areas. Air flowing through the container 900 from the vent aperture 222 to the inlet 202 may push the mulch 910 into the blower 200.

In some embodiments, the container 900 may be a cart 250 which may be pulled. In some embodiments, the cart 250 may be self-propelled by energizing a drive motor 252 to turn the rear wheels 260 of the cart 250.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used in this disclosure, "flexible" may refer to an object or material which will deform when a force is applied to it, which will not return to its original shape when the deforming force is removed, and which may not retain the deformed shape caused by the deforming force.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hitch" may be a fastening apparatus that can enable an object to be towed.

As used in this disclosure, a "housing" may be a rigid or semi-rigid casing that encloses and protects one or more devices.

As used in this disclosure, a "latch" may be a fastening or locking mechanism. The use of the term latch may imply the insertion of an object into a notch or cavity. The act of latching may involve a linear, pivoting, or rotating motion.

As used in this disclosure, a "lid" may be a movable or removable cover that is placed on a hollow structure to contain and/or protect the contents within the hollow structure.

As used in this disclosure, a "motor" may refer to a device that transforms energy from an external power source into mechanical energy.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used herein, "rigid" may refer to an object or material which is inflexible.

As used in this disclosure, a "rim" may be an outer edge or border that follows along the perimeter of an object.

As used herein, "vacuum" may refer to a first space that contains gas at a reduced gas pressure relative to the gas pressure of a second space. If the first space and the second space are connected together, this pressure differential will cause gas from the second space to move towards the first space until the pressure differential is eliminated.

As used herein, "vent" may refer to one or more openings in the structure that allow air to enter or escape.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mulch-dispensing system comprising:
a blower, a cover;
wherein the cover detachably couples to the top of a container holding mulch;
wherein the blower draws the mulch into an inlet and expels the mulch from a discharge hose;
wherein the discharge hose is adapted to be held by a user to direct the mulch onto targeted landscape areas;
wherein the cover is a lid that detachably couples to the container;
wherein the cover enables the blower to lower an air pressure within the container in order to draw the mulch into the blower;
wherein the mulch-dispensing system comprises a cart as the container;
wherein the cart is a wheelbarrow.

2. The mulch-dispensing system according to claim 1
wherein the blower moves the mulch by drawing the mulch in through the inlet and expelling the mulch through the discharge hose;
wherein the blower is electromechanical in nature.

3. The mulch-dispensing system according to claim 2
wherein an internal electric motor of the blower is energized and rotates an impeller, spins fan blades, or moves other mechanical parts to draw the mulch in via the inlet and expel the mulch via the discharge hose.

4. The mulch-dispensing system according to claim 2
wherein the inlet is a rigid tube located within the container and oriented to extend downward from the bottom of the blower into the mulch.

5. The mulch-dispensing system according to claim 4
wherein the discharge hose is a flexible hose located outside of the container through which the mulch passes after exiting the blower.

6. The mulch-dispensing system according to claim 5
wherein the blower is enclosed by a blower housing located within the container.

7. The mulch-dispensing system according to claim 6
wherein the cover comprises a pivot clamp that couples to the top of the container at one end of the container;
wherein the cover pivots open at the pivot clamp in order to place the mulch into the container.

8. The mulch-dispensing system according to claim 7
wherein the cover comprises a latch at the end of the cover that is opposite the pivot clamp;
wherein the latch removably couples to the top of the container;
wherein the latch is operable to hold the cover closed while using the mulch-dispensing system.

9. The mulch-dispensing system according to claim 7
wherein the cover comprises a rim;
wherein the rim projects downward from the periphery of the cover and surrounds the top of the container when the cover is closed.

10. The mulch-dispensing system according to claim 9
wherein an inside edge of the rim engages the container by pressing against the container in order to create a seal between the cover and the container.

11. The mulch-dispensing system according to claim 10
wherein the cover comprises a vent aperture;
wherein the vent aperture is operable to provide a path for air to enter the container to replace the air pumped out by the blower.

12. The mulch-dispensing system according to claim 11
wherein one or more batteries are provided to power the blower;
wherein the one or more batteries comprise one or more energy-storage devices;
wherein the one or more batteries are a source of electrical energy to operate the blower;
wherein the one or more batteries are rechargeable and/or replaceable.

13. The mulch-dispensing system according to claim 12
wherein the cart is a four-wheeled wagon for holding the mulch.

14. The mulch-dispensing system according to claim 13
wherein the cart includes a hitch such that the cart can be pulled.

15. The mulch-dispensing system according to claim 13
wherein the cart is self-propelled.

16. The mulch-dispensing system according to claim 15
wherein the cart comprises a drive motor that is directly or indirectly coupled to rear wheels of the cart such that energizing the drive motor causes the rear wheels to turn.

17. A mulch-dispensing system comprising:
a blower, a cover;
wherein the cover detachably couples to the top of a container holding mulch;
wherein the blower draws the mulch into an inlet and expels the mulch from a discharge hose;
wherein the discharge hose is adapted to be held by a user to direct the mulch onto targeted landscape areas;
wherein the cover is a lid that detachably couples to the container;
wherein the cover enables the blower to lower an air pressure within the container in order to draw the mulch into the blower;
wherein the mulch-dispensing system comprises a cart as the container;
wherein the cart is a wheelbarrow with a hitch that is configured to be pulled or pushed by a lawnmower.

* * * * *